US010375144B2

(12) United States Patent
Lim et al.

(10) Patent No.: US 10,375,144 B2
(45) Date of Patent: Aug. 6, 2019

(54) UPLOADING OVER PARALLEL REQUESTS

(71) Applicants: Sony Corporation, Tokyo (JP); Sony Media Cloud Services LLC, Culver City, CA (US)

(72) Inventors: Sheldon Lim, San Francisco, CA (US); Brian Laske, Orange, CA (US); Henry Anderson, Redmond, WA (US); Art Fort, New Smyrna Beach, FL (US)

(73) Assignees: SONY CORPORATION, Tokyo (JP); SONY MEDIA CLOUD SERVICES, LLC, Culver City, CA (US)

( * ) Notice: Subject to any disclaimer, the term of this patent is extended or adjusted under 35 U.S.C. 154(b) by 241 days.

(21) Appl. No.: 14/868,193

(22) Filed: Sep. 28, 2015

(65) Prior Publication Data

US 2017/0093954 A1    Mar. 30, 2017

(51) Int. Cl.
H04L 29/08    (2006.01)
H04L 29/12    (2006.01)
H04L 29/06    (2006.01)

(52) U.S. Cl.
CPC .......... *H04L 67/06* (2013.01); *H04L 67/02* (2013.01); *H04L 67/2847* (2013.01); *H04L 67/42* (2013.01); *H04L 61/1511* (2013.01)

(58) Field of Classification Search
CPC ..... H04L 67/06; H04L 67/02; H04L 67/2847; H04L 67/42; H04L 61/1511
See application file for complete search history.

(56) References Cited

U.S. PATENT DOCUMENTS

| | | | |
|---|---|---|---|
| 6,973,491 B1 | 12/2005 | Staveley et al. | |
| 8,473,585 B1* | 6/2013 | Smith | H04L 67/1097 709/218 |
| 2008/0098101 A1 | 4/2008 | Black et al. | |
| 2009/0094652 A1 | 4/2009 | Al Adham et al. | |
| 2011/0082945 A1* | 4/2011 | Myers | H04N 21/234327 709/231 |
| 2011/0218884 A1* | 9/2011 | Kothari | G06Q 30/02 705/27.1 |
| 2012/0198506 A1* | 8/2012 | Joe | H04N 21/44209 725/97 |
| 2014/0155043 A1* | 6/2014 | Gell | H04W 4/60 455/414.1 |
| 2014/0325024 A1* | 10/2014 | Lyle | H04L 29/08027 709/219 |
| 2015/0156520 A1* | 6/2015 | Thakkar | G06T 1/00 725/93 |
| 2015/0281331 A1* | 10/2015 | Steiner | H04L 69/14 709/203 |
| 2016/0246538 A1* | 8/2016 | Vazhenin | G06F 12/1408 |
| 2017/0048021 A1* | 2/2017 | Yanovsky | G06F 16/1824 |

FOREIGN PATENT DOCUMENTS

EP    2615790 A1 *   7/2013   ......... H04L 65/4084
EP    2615790 A1 *   7/2013   ......... H04L 65/4084

* cited by examiner

*Primary Examiner* — Uzma Alam
(74) *Attorney, Agent, or Firm* — Procopio, Cory, Hargreaves & Savitch LLP

(57) ABSTRACT

Uploading a file in a distributed manner to a server, including: dividing the file into a plurality of chunks; generating a plurality of aliases to a hostname corresponding to the server; and uploading the plurality of chunks to the plurality of aliases corresponding to the server. Key words include distributed uploading and aliases.

17 Claims, 4 Drawing Sheets

UPLOADING OVER PARALLEL REQUESTS

BACKGROUND

Field of the Invention

The present invention relates to uploading a file, and more specifically, to uploading a file in multiple chunks in a parallel manner.

Background

When a file is uploaded using a browser, the entire file can be uploaded in a single request or multiple chunks. If the file is uploaded in multiple chunks, the chunks can be submitted in parallel to increase the bandwidth utilization. However, the majority of current browsers limit the total number of simultaneous hypertext transfer protocol (HTTP) requests (or submissions) to a single hostname to six. Thus, for example, if the upload speed over a single request is 4 megabits per second (Mbps), then the maximum achievable upload speed with six requests is 24 Mbps.

Currently, a file must be completely uploaded before it can be processed. However, if the file is very large (e.g., in the gigabyte range) relative to the upload speed (e.g., 1 Mbps), then the wait time for the file to completely upload so that the processing can begin on the server side can be very long.

SUMMARY

The present invention provides for uploading a file in a distributed manner to a server.

In one implementation, a method of uploading a file in a distributed manner to a server is disclosed. The method includes: dividing the file, at a client device, into a plurality of chunks; generating a plurality of aliases to a hostname corresponding to the server; and uploading the plurality of chunks to the plurality of aliases corresponding to the server.

In another implementation, a distributed data uploading system is disclosed. The system includes: a client stream parser configured to receive and divide a file into a plurality of chunks; and a client uploader configured to generate a plurality of aliases to a hostname corresponding to a server, the client uploader to upload the plurality of chunks in a distributed manner to the plurality of aliases corresponding to the server.

In another implementation, an apparatus for uploading a file in a distributed manner to a server is disclosed. The apparatus includes: means for dividing the file into a plurality of chunks; means for generating a plurality of aliases to a hostname corresponding to the server; and means for uploading the plurality of chunks to the plurality of aliases corresponding to the server.

In another implementation, an apparatus for is disclosed. The apparatus includes: a processor; a computer-readable storage medium coupled to the processor, the computer-readable storage medium storing a computer program to upload a file in a distributed manner to a server, the computer program comprising instructions executable by the processor that cause the apparatus to: divide the file into a plurality of chunks; generate a plurality of aliases to a hostname corresponding to the server; and upload the plurality of chunks to the plurality of aliases corresponding to the server.

Other features and advantages of the present invention should be apparent from the present description which illustrates, by way of example, aspects of the invention.

BRIEF DESCRIPTION OF THE DRAWINGS

The details of the present invention, both as to its structure and operation, may be gleaned in part by study of the appended further drawings, in which like reference numerals refer to like parts, and in which.

DETAILED DESCRIPTION

Figure 1:
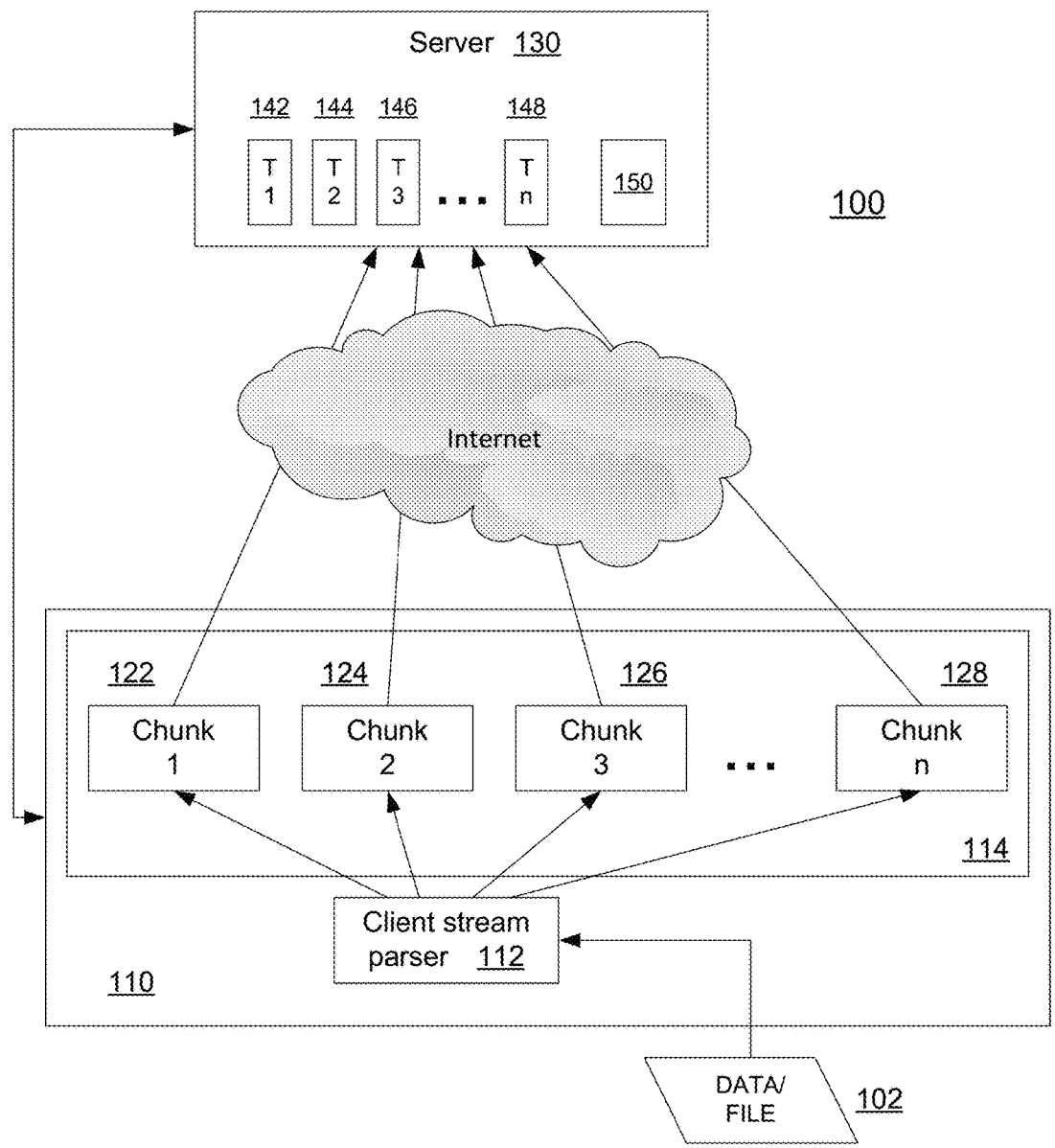
FIG. 1 is a functional block diagram of a distributed data uploading system in accordance with one implementation of the present disclosure.

Certain implementations as disclosed herein provide for apparatus, systems, and methods for following: (1) uploading a file in multiple chunks in a parallel manner (e.g., using an HTTP request handler); (2) tracking the multiple chunks for reassembling them once the upload is completed; (3) transcoding the multiple chunks while uploading; (4) using predictive caching of the HTTP request handler to determine the priority order of the chunks; and (5) pre-caching of the chunks based on the priority order.

After reading this description it will become apparent how to implement the disclosure in various implementations and applications. However, although various implementations of the present disclosure will be described herein, it is understood that these implementations are presented by way of example only, and not limitation. As such, this detailed description of various implementations should not be construed to limit the scope or breadth of the present disclosure.

One implementation includes systems and methods which increase the bandwidth utilization while uploading. In this implementation, a file, such as an encrypted file storing a movie, is divided into chunks (or blocks) and the chunks are uploaded in parallel. However, as stated above, the majority of current browsers limit the total number of simultaneous HTTP requests to a single hostname to six. Thus, if the upload speed over a single request is 4 megabits per second (Mbps), then the maximum achievable upload speed with six requests is 24 Mbps.

One solution for the limitation of simultaneous HTTP requests to a single hostname is to create aliases to the same hostname so that they appear as different hostnames to the browser. For example, multiple canonical name (CNAME) records in the Domain Name System (DNS) can be generated to create multiple aliases to the same hostname. Thus, by generating 30 CNAMEs to the same hostname, for example, a sustained transfer rate of up to 720 Mbps (24 Mbps×30=720 Mbps) can be achieved from a single machine. An alternative solution for the limitation of simultaneous HTTP requests to a single hostname is to actually upload the multiple chunks to different hostnames but track the location of each chunk so that the chunks can be reassembled later. In one example, 30 chunks are uploaded to 30 different Simple Storage Service (S3) buckets. Thus, the chunks are tracked by noting the corresponding S3 bucket identifiers.

Another implementation includes systems and methods which enable processing (e.g., for previewing and sharing) of a file before it has completed uploading. In some implementations, the systems and methods include using parallelism to upload a plurality of chunks of the file at a high speed. In other implementations, the systems and methods also include communicating with the server to determine which chunks should be transmitted first and requesting that the file transcode be generated as soon as the file upload begins. The file transcode may be performed over one to many machines to ensure that the file is transcoded as fast as it is uploaded. The file can be made available for live streaming as the transcoding progresses. In further example implementations, a predictive caching http request handler is used to determine which chunks are needed and in what order, and to pre-cache those chunks as applicable.

FIG. 1 is a functional block diagram of a distributed data uploading system 100 in accordance with one implementation of the present disclosure. The distributed data uploading system 100 is configured to increase the bandwidth utilization while uploading. In the illustrated implementation of FIG. 1, a file 102, such as an encrypted file storing a movie, is sent to a client stream parser 112 which divides the file 102 into a plurality of chunks or blocks (e.g., chunk 1 through chunk n) 122, 124, 126, 128. In one implementation, the client stream parser 112 is included in a client device 110 (e.g., a laptop, mobile device, media device, or desktop computer). The chunks are then uploaded in parallel to a server 130 via the Internet.

In one implementation, the client device 110 includes a client uploader 114 configured to generate a plurality of aliases to a hostname corresponding to a server. The client uploader 114 uploads the plurality of chunks in a distributed manner to the plurality of aliases corresponding to the server 130. Although the server 130 is shown as a single server, in other implementations, the server 130 may be implemented using a number of servers, such as a server farm or distributed server network.

In FIG. 1, the server 130 includes a plurality of transcoders (e.g., transcoders T1 through Tn) 142, 144, 146, 148 which transcodes the chunks in parallel. In the illustrated implementation of FIG. 1, each transcoder may receive and transcode one uploaded chunk at one time. In another implementation, there is no one-to-one correspondence between a transcoder 142, 144, 146, 148 and a chunk 122, 124, 126, 128. For example, a transcoder may span many chunks. In another example, a single chunk may need to be processed by a plurality of transcoders.

In one implementation, the client uploader 114 of the client device 110 communicates with the server 130 to determine which chunks should be uploaded first. The client uploader 114 can prioritize the upload order based on priority of each chunk rather than sequential order. Thus, the client uploader 114 may request that the prioritized chunks be transcoded as soon as the file upload (i.e., chunk uploads) begins.

In one implementation, each transcoder of the plurality of transcoders 142, 144, 146, 148 residing in a server 130 can be designated to an alias (e.g., a CNAME record) so that a single server (e.g., server 130) with a single hostname can appear as different hostnames. Although FIG. 1 shows transcoders, any processor can used to process (e.g., to preview and share) the file 102 before it has completed uploading.

In another implementation, each transcoder is designated to an alias and receives a single chunk to process, but the plurality of transcoders 142, 144, 146, 148 is configured to reside in different servers with different hostnames. In this implementation, the location of each chunk is tracked so that the chunks 122, 124, 126, 128 can be reassembled later (either in the foreground or background). For example, the chunks are uploaded to a plurality of S3 buckets and the chunks are tracked by noting the corresponding S3 bucket identifiers.

In yet another implementation, the client stream parser 112 communicates with the server 130 to determine which chunks should be transmitted first and requesting that the file transcode be generated as soon as the file upload begins. The file transcode by the transcoders 142, 144, 146, 148 may be performed over one to many machines to ensure that the file 102 is transcoded as fast as it is uploaded. The file 102 can be made available for live streaming as the transcoding progresses. In one implementation, a predictive caching http request handler is used to determine which chunks are needed and in what order, and to pre-cache those chunks as applicable.

The client stream parser 112 may monitor the transfer of a plurality of chunks 122, 124, 126, 128 transmitted in parallel to the server 130. In one implementation, the client stream parser 112 may initiate upload of the plurality of chunks by initiating a separate execution thread associated with each chunk. In another implementation, each chunk may be transmitted using a separate process. The client stream parser 112 may monitor the upload to verify that the chunks will be received in order at the server 130. The server 130 may temporarily store incoming chunks in a cache 150.

Figure 2:
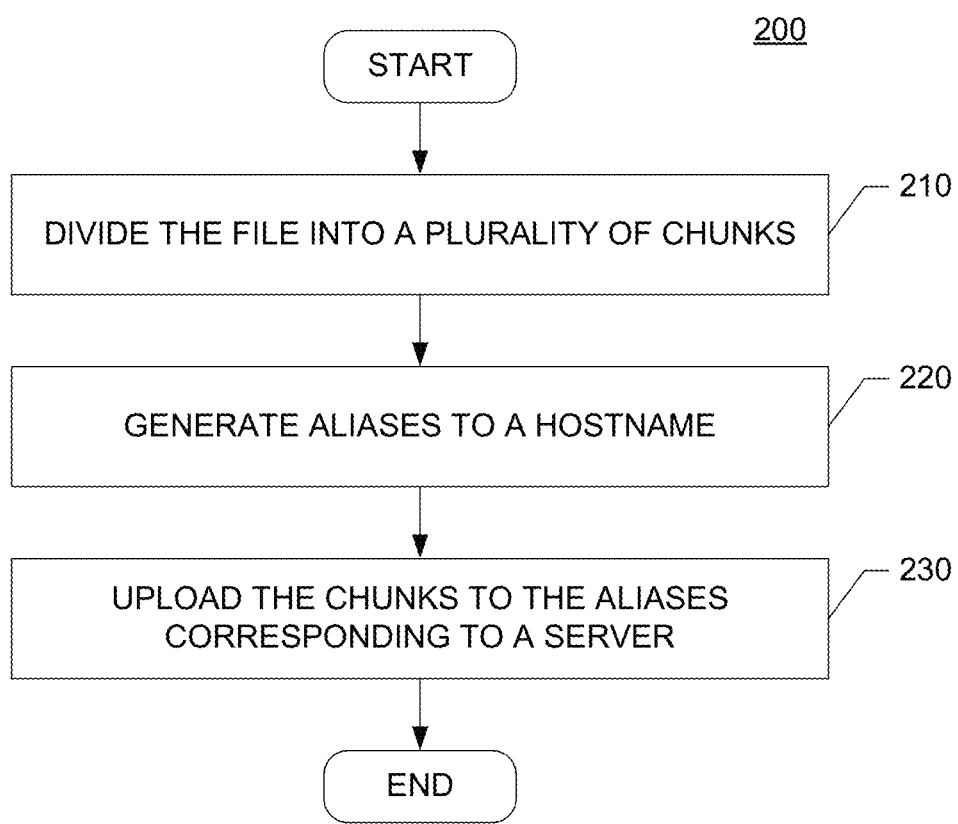
FIG. 2 is a flow diagram illustrating a method of uploading data in a distributed manner in accordance with one implementation of the present disclosure.

FIG. 2 is a flow diagram illustrating a method 200 of uploading data in a distributed manner in accordance with one implementation of the present disclosure. The method increases the bandwidth utilization while uploading. In one implementation, the method 200 of uploading data may be executed by the client stream parser 112 residing on the client device 110. In the illustrated implementation of FIG. 2, a file 102, such as an encrypted file storing a movie, is divided, at block 210, into a plurality of chunks or blocks. In one implementation, each of the chunks 122, 124, 126, 128 may be equal in size. In another implementation, the size of each chunk may be variable between 0.5 and 8 megabytes. In yet another implementation, the maximum chunk size may need to be much bigger, up to 500 megabytes, or more, depending on the size of the source file. The reason for this is that there may be a limitation on the number of chunks allowed for an upload. For example, if the client is uploading a 5 terabyte file, and there is a limit of 10,000 chunks per upload, then each chunk size must be over 500 megabyte. Although there may be unlimited number of chunks per upload, a limit of 10,000 chunks may be placed for a practical reason. In a further implementation, the size of each chunk depends on various factors including the bandwidth availability, the available memory of the client device, and/or the correlation between source file size and the limitation on the number of chunks.

Aliases to a hostname are then generated, at block 220, so that the hostname of the aliases appears as different hostnames to the browser. For example, multiple canonical name (CNAME) records in the Domain Name System (DNS) can be generated to create multiple aliases to the same hostname. The plurality of chunks is then uploaded, at block 230, to the aliases of the hostname corresponding to the server.

Figure 3:
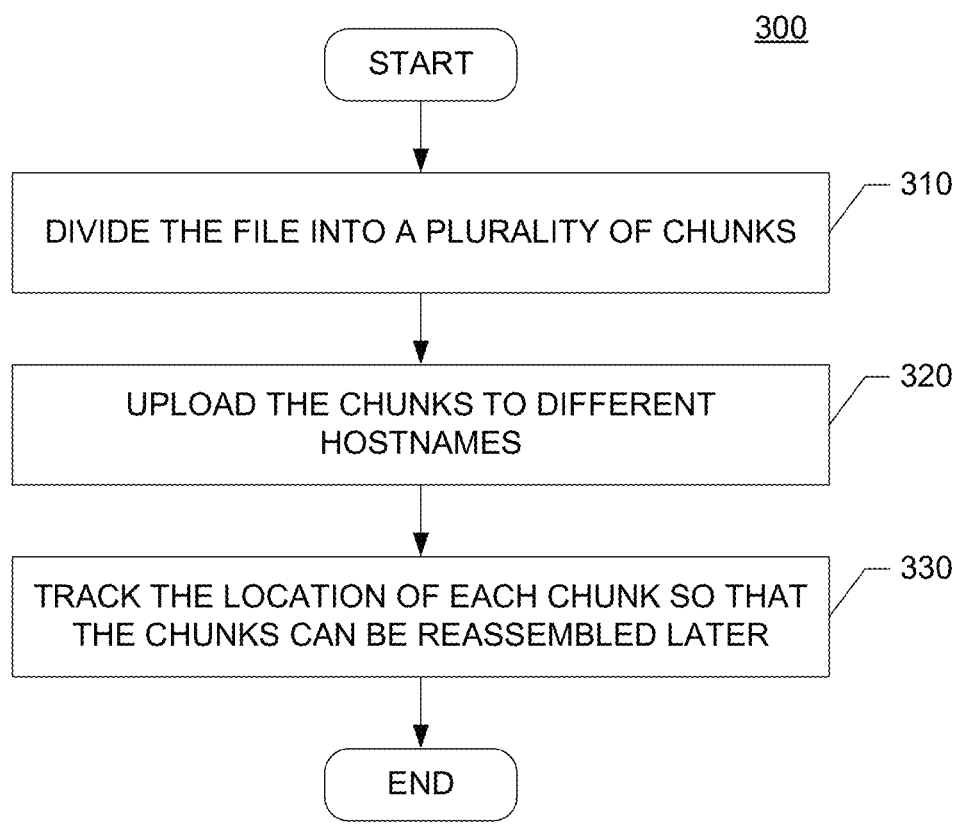
FIG. 3 is a flow diagram illustrating a method of uploading data in a distributed manner in accordance with another implementation of the present disclosure.

FIG. 3 is a flow diagram illustrating a method 300 of uploading data in a distributed manner in accordance with another implementation of the present disclosure. In the illustrated implementation of FIG. 3, a file 102, such as an encrypted file storing a movie, is divided, at block 310, into a plurality of chunks or blocks. The plurality of chunks is then uploaded, at block 320, to different hostnames. In one implementation, the plurality of chunks is uploaded by initiating a separate execution thread associated with each chunk. In another implementation, each chunk may be uploaded using a separate process. The location of each chunk is then tracked, at block 330, so that the chunks can be reassembled later. The chunks may be monitored or tracked to verify that the chunks will be received in order at the server.

Figure 4:
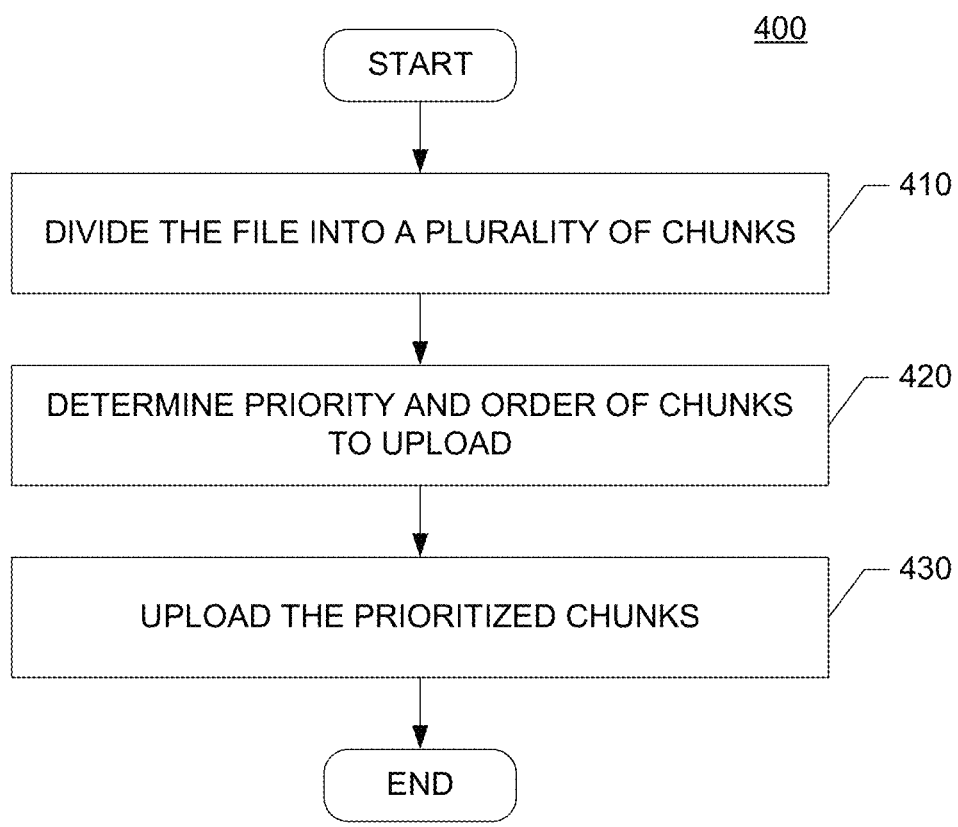
FIG. 4 is a flow diagram illustrating a method of uploading data in a distributed manner in accordance with another implementation of the present disclosure.

FIG. 4 is a flow diagram illustrating a method 400 of uploading data in a distributed manner in accordance with another implementation of the present disclosure. In the illustrated implementation of FIG. 4, a file 102, such as an encrypted file storing a movie, is divided, at block 410, into a plurality of chunks or blocks. A determination is made, at block 420, to determine which chunks should be uploaded first. The determination of the priority and order of the chunks may be made using a predictive caching http request handler. The prioritized chunks are then uploaded, at block 430. In one implementation, the chunks are pre-cached before the upload. In another implementation, the chunks are post-cached after the upload. In one implementation, an HTTP proxy server is used to analyze the patterns in the bytes that are being requested and to predictively read ahead to fetch more bytes before they are needed. The fetched bytes can then be cached in memory to be delivered later on demand.

One implementation includes one or more programmable processors and corresponding computer system components to store and execute computer instructions. Combinations of hardware, software, and firmware can also be used. For example, in the distributed data uploading system 100, client stream parser 112 and the transcoders 142, 144, 146, 148 can be performed by one or more computer systems executing appropriate computer instructions on one or more processors utilizing appropriate components and systems (such as memory, computational units, buses, etc.).

Additional variations and implementations are also possible. While several examples address transcoding of files and data representing video, such as a movie or television program, other data can also be used, such as audio, image data, software, scientific or medical data, etc. Thus, the above description of the disclosed implementations is provided to enable any person skilled in the art to make or use the disclosure. Various modifications to these implementations will be readily apparent to those skilled in the art, and the generic principles described herein can be applied to other embodiments without departing from the spirit or scope of the disclosure. Accordingly, the techniques are not limited to the specific examples described above. Thus, it is to be understood that the description and drawings presented herein represent a presently preferred embodiment of the disclosure and are therefore representative of the subject matter that is broadly contemplated by the present disclosure. It is further understood that the scope of the present disclosure fully encompasses other embodiments that may become obvious to those skilled in the art and that the scope of the present disclosure is accordingly limited by nothing other than the appended claims.

What is claimed is:

1. A method of uploading a file in a distributed manner to a server using a browser and using multiple aliases as multiple hostnames, the method comprising:
    dividing the file, at a client device, into a plurality of chunks;
    generating a plurality of aliases for a hostname corresponding to the server so that the plurality of aliases appears as different hostnames to the browser; and
    uploading at least one of the plurality of chunks to each of the plurality of aliases corresponding to the server using simultaneous hypertext transfer protocol (HTTP) requests to the plurality of aliases,
    wherein a number of the simultaneous HTTP requests made to the plurality of aliases is more than a maximum number of simultaneous HTTP requests that can be made to the hostname without the use of the plurality of aliases,
    wherein the uploading delivers the plurality of chunks of the file to the hostname corresponding to the server quicker than without the use of the plurality of aliases.

2. The method of claim 1, wherein generating a plurality of aliases comprises
    generating multiple canonical name (CNAME) records in Domain Name System (DNS).

3. The method of claim 1, wherein the file is an encrypted file storing a movie.

4. The method of claim 1, wherein sizes of the plurality of chunks are variable between 0.5 and 500 megabytes.

5. The method of claim 4, wherein a size of each chunk of the plurality of chunks depends on factors including bandwidth availability, memory availability of the client device, and correlation between a size of the file and a count limit of the plurality of chunks.

6. The method of claim 1, wherein uploading the plurality of chunks comprises
    initiating a separate execution thread associated with each chunk of the plurality of chunks.

7. The method of claim 1, further comprising
    tracking a location of each chunk of the plurality of chunks so that the plurality chunks can be reassembled later.

8. The method of claim 7, wherein tracking a location of each chunk comprises
    monitoring each chunk to verify that the plurality of chunks is received in order at the server.

9. The method of claim 1, further comprising
    ordering according to a priority of each chunk of the plurality of chunks.

10. The method of claim 9, wherein ordering comprises
    prioritizing the plurality of chunks using predictive caching hypertext transfer protocol (HTTP) request handler.

11. The method of claim 10, wherein prioritizing the plurality of chunks comprises
    using an HTTP proxy server to analyze byte patterns that are being requested to predictively read ahead.

12. The method of claim 1, further comprising
    pre-caching the plurality of chunk in memory to be deliver later on demand.

13. The method of claim 1, wherein the client device is a media device.

14. The method of claim 1, wherein the server is configured as a distributed server network.

15. An apparatus for uploading a file in a distributed manner to a server using a browser and using multiple aliases as multiple hostnames, the apparatus comprising:
    means for dividing the file into a plurality of chunks;
    means for generating a plurality of aliases for a hostname corresponding to the server so that the plurality of aliases appears as different hostnames to the browser; and
    means for uploading at least one of the plurality of chunks to each of the plurality of aliases corresponding to the server using simultaneous HTTP requests to the plurality of aliases,
    wherein a number of the simultaneous HTTP requests made to the plurality of aliases is more than a maximum number of simultaneous HTTP requests that can be made to the hostname without the use of the plurality of aliases, wherein the means for uploading delivers the plurality of chunks of the file to the hostname corresponding to the server quicker than without the use of the plurality of aliases.

16. An apparatus comprising:

a processor;

a non-transitory computer-readable storage medium coupled to the processor, the computer-readable storage medium storing a computer program to upload a file in a distributed manner to a server using a browser and using multiple aliases as multiple hostnames, the computer program comprising instructions executable by the processor that cause the apparatus to:

divide the file into a plurality of chunks;

generate a plurality of aliases for a hostname corresponding to the server so that the plurality of aliases appears as different hostnames to the browser; and upload at least one of the plurality of chunks to each of the plurality of aliases corresponding to the server using simultaneous HTTP requests to the plurality of aliases, wherein a number of the simultaneous HTTP requests made to the plurality of aliases is more than a maximum number of simultaneous HTTP requests that can be made to the hostname without the use of the plurality of aliases, wherein the executable instructions that cause the apparatus to upload at least one of the plurality of chunks deliver the plurality of chunks of the file to the hostname corresponding to the server quicker than without the use of the plurality of aliases.

17. The apparatus of claim 16, wherein the apparatus is a media device.

* * * * *